US011150934B2

(12) United States Patent
Beaty et al.

(10) Patent No.: US 11,150,934 B2
(45) Date of Patent: Oct. 19, 2021

(54) REGION BASED PROCESSING AND STORAGE OF DATA

(71) Applicant: International Business Machines Corporation, Armonk, NY (US)

(72) Inventors: Kirk A. Beaty, Goldens Bridge, NY (US); Jose I. Ramirez, Cartago (CR); Bhuvan Sharma, Belmont, MA (US)

(73) Assignee: International Business Machines Corporation, Armonk, NY (US)

( * ) Notice: Subject to any disclaimer, the term of this patent is extended or adjusted under 35 U.S.C. 154(b) by 124 days.

(21) Appl. No.: 16/377,658

(22) Filed: Apr. 8, 2019

(65) Prior Publication Data

US 2020/0319908 A1 Oct. 8, 2020

(51) Int. Cl.
*G06F 9/455* (2018.01)
*G06F 16/909* (2019.01)
*G06F 9/50* (2006.01)

(52) U.S. Cl.
CPC .......... *G06F 9/45558* (2013.01); *G06F 9/50* (2013.01); *G06F 16/909* (2019.01); *G06F 2009/45595* (2013.01); *G06F 2209/5011* (2013.01)

(58) Field of Classification Search
CPC .................................................. G06F 9/45533
USPC .......................................................... 718/1
See application file for complete search history.

(56) References Cited

U.S. PATENT DOCUMENTS

| | | | | |
|---|---|---|---|---|
| 8,799,994 B2* | 8/2014 | Barton | ............... | H04L 63/20 726/1 |
| 9,253,053 B2* | 2/2016 | Nelke | ............... | H04L 41/5051 |
| 9,311,499 B2* | 4/2016 | Redlich | ............... | G06F 21/6209 |
| 9,514,324 B1* | 12/2016 | Potlapally | ............... | H04L 63/10 |
| 9,641,630 B2* | 5/2017 | Broussard | ............... | H04L 63/0492 |
| 2012/0078643 A1* | 3/2012 | Nagpal | ............... | G06Q 30/02 705/1.1 |
| 2013/0019089 A1* | 1/2013 | Guidotti | ............... | G06F 9/5072 713/100 |
| 2016/0173623 A1* | 6/2016 | Broussard | ............... | H04L 67/42 713/168 |
| 2016/0337332 A1* | 11/2016 | Ghosh | ............... | G06Q 10/00 |
| 2016/0357739 A1* | 12/2016 | Rathinagiri | ............... | G06F 16/168 |
| 2017/0272412 A1* | 9/2017 | Rose | ............... | H04L 9/0872 |
| 2017/0277709 A1* | 9/2017 | Strauss | ............... | G06F 3/0631 |
| 2019/0150027 A1* | 5/2019 | Ner | ............... | H04W 74/085 370/235 |
| 2020/0169606 A1* | 5/2020 | Kreutzer | ............... | G06F 16/903 |

* cited by examiner

*Primary Examiner* — Mehran Kamran
(74) *Attorney, Agent, or Firm* — Ryan Lewis; Edell, Shapiro & Finnan, LLC

(57) ABSTRACT

A method, a system, and a computer program product are provided. A first computing device determines that data to be processed for a request is confined to a geographic region in which the data is stored and identifies a second computing device within the geographic region in which the data is stored, wherein the identified second computing device and the computing device are connected to a network. The computing device directs the identified second computing to process the data within the geographic region to which the data is confined, according to the request, by one or more processing nodes executing on the identified second computing device.

15 Claims, 8 Drawing Sheets

REGION BASED PROCESSING AND STORAGE OF DATA

BACKGROUND

1. Technical Field

Present invention embodiments relate to processing and storage of data using multitenant systems. In particular, the present invention embodiments relate to use of multitenant systems on which data may be processed and stored, wherein the processing and the storage of data with respect to at least some accounts on the multitenant systems are confined to a respective particular geographic region.

2. Discussion of the Related Art

Multitenant systems process data for multiple customers who share the multitenant systems and separately store the processed data. However, various laws and/or regulations may require certain types of data to be confined to a geographic region. For example, such laws and/or regulations may require sensitive data such as, for example, DNA data, health-related data, and other sensitive data, to be confined to a geographic region such as, for example, a country, a county, a city or a town, or other geographic region. Further, export regulations for respective geographic regions such as, for example, countries, may restrict certain defense-related or other technical information from leaving the respective geographic regions.

Although sensitive data can be encrypted, for security purposes, and securely transferred outside of a geographic region to which the data is required to be confined, at some point the encrypted data residing outside of the geographic region may be decrypted for processing and may become susceptible to unauthorized access.

SUMMARY

According to one embodiment of the present invention, a method is provided for a computing device that includes at least one processor and at least one memory. The at least one memory includes instructions by the at least one processor of the computing device to process data based on a geographic region in which the data is confined. According to the method, a determination is made that data to be processed for a request is confined to the geographic region in which the data is stored. A second computing device within the geographic region in which the data is stored is identified, the identified second computing device and the computing device being connected to a network. The identified second computing device is directed to process the data within the geographic region to which the data is confined, according to the request, by one or more processing nodes executing on the identified second computing device.

According to a second embodiment of the present invention, a system is provided for processing data based on a geographic region in which the data is stored. The system includes a computing device configured to determine that data to be processed for a request is confined to the geographic region in which the data is stored. The computing device is further configured to identify a second computing device within the geographic region in which the data is stored, the identified second computing device and the computing device being connected to a network. The computing device is further configured to direct the identified second computing device to process the data within the geographic region to which the data is confined, according to the request, by one or more processing nodes executing on the identified second computing device.

In a third embodiment of the present invention, a computer program product is provided. The computer program product includes at least one computer readable storage medium having computer readable program code embodied therewith. The computer readable program code includes instructions for execution on at least one processor of a computing device. The instructions of the computer readable program code are configured to be executed by the at least one processor to determine that data to be processed is confined to a geographic region in which the data are stored, and identify a second computing device within the geographic region in which the data is stored, the second computing device and the computing device being connected to a network. The at least one processor is further configured to direct the identified second computing device to process the data within the geographic region to which the data is confined, according to the request, by one or more processing nodes executing on the identified second computing device.

BRIEF DESCRIPTION OF THE DRAWINGS

Generally, like reference numerals in the various figures are utilized to designate like components.

DETAILED DESCRIPTION

In various embodiments, a user associated with an account may sign into a server of a multitenant system such as, for example, a multitenant system in a cloud computing environment. Upon successfully signing into the server, the server may access account information associated with the user to determine whether processing and storage of data are to be confined to a particular geographic region such as, for example, a country, a state or province, or a political subdivision of the state or province, which may include, but not be limited to, a county, a city, a town, or a village. The server may receive a request to process sensitive data from the signed-in user. If, according to the accessed account information, the sensitive data is to remain confined within the particular geographic region, the server may identify at least one computing device within the particular geographic region for processing the sensitive data and at least one storage device within the particular geographic region for storing the sensitive data and/or the processed sensitive data, wherein the at least one computing device and the server may be connected via a network in the cloud computing environment and the at least one computing device has access to the at least one storage device. The sensitive data to be processed may have been previously stored on one or more storage devices located within the particular geographic region. One or more processing nodes within the at least one computing device may process the sensitive data and may store the processed sensitive data on the at least one storage device. In some embodiments, each of the one or more processing nodes may include a respective virtual machine for processing of data associated with the account. In this way, embodiments may confine sensitive data to a particular geographic region in which the data are stored.

Figure 1:
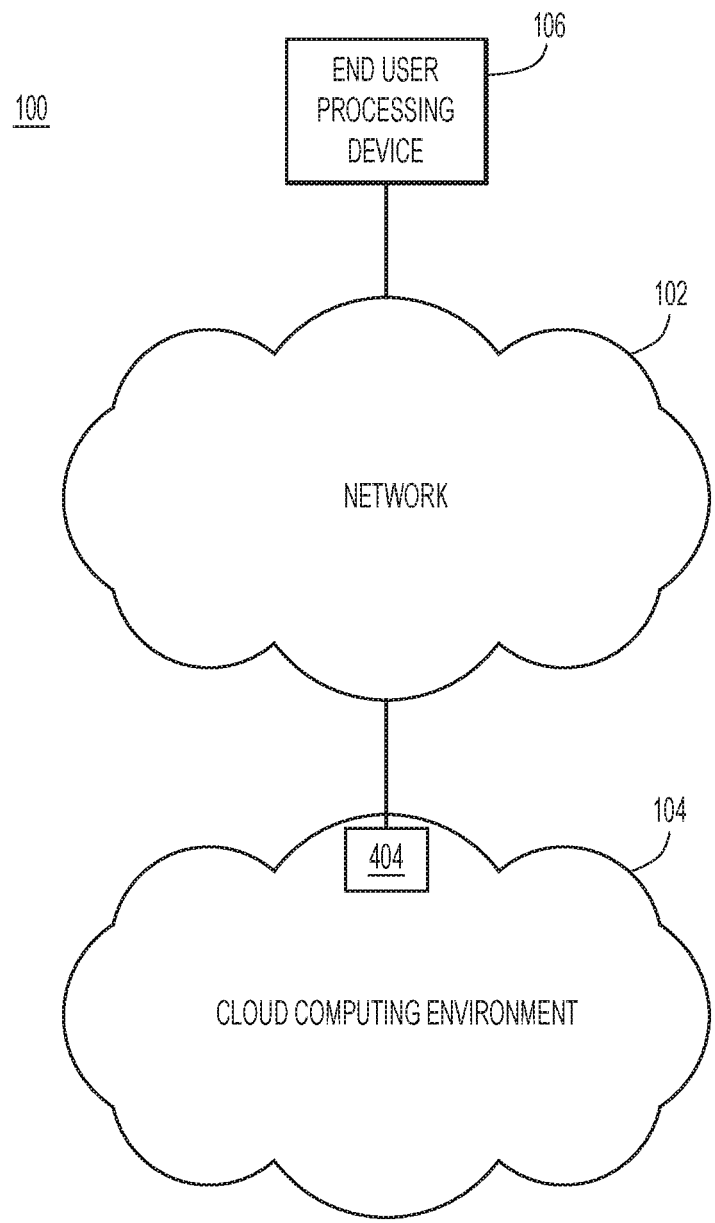
FIG. 1 shows an example operating environment according to embodiments of the invention.

An example environment 100 for use with present invention embodiments is illustrated in FIG. 1. Specifically, environment 100 may include one or more end user processing devices 106, which may be connected to a network 102. Network 102 may have a connection to a cloud computing environment 104 via a central server 404. Network 102 may be implemented by any number of any suitable communications media (e.g., wide area network (WAN), local area network (LAN), Internet, Intranet, etc.). End user processing device 106 and central server 404 may be connected to network 102 either wirelessly or via a wired connection. In some embodiments, end user processing device 106 may be connected to central server 404 via a modem and a telephone line, or via other methods. Further, in some embodiments, central server 404 may include a server farm.

End user processing device 106 may include a handheld computing device, a tablet computer, a smartphone, a laptop computing device, a desktop computing device, or other type of computing device.

Central server 404 may include a laptop computing device, a desktop computing device, a tablet computing device, or other type of computing device.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multitenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 2:
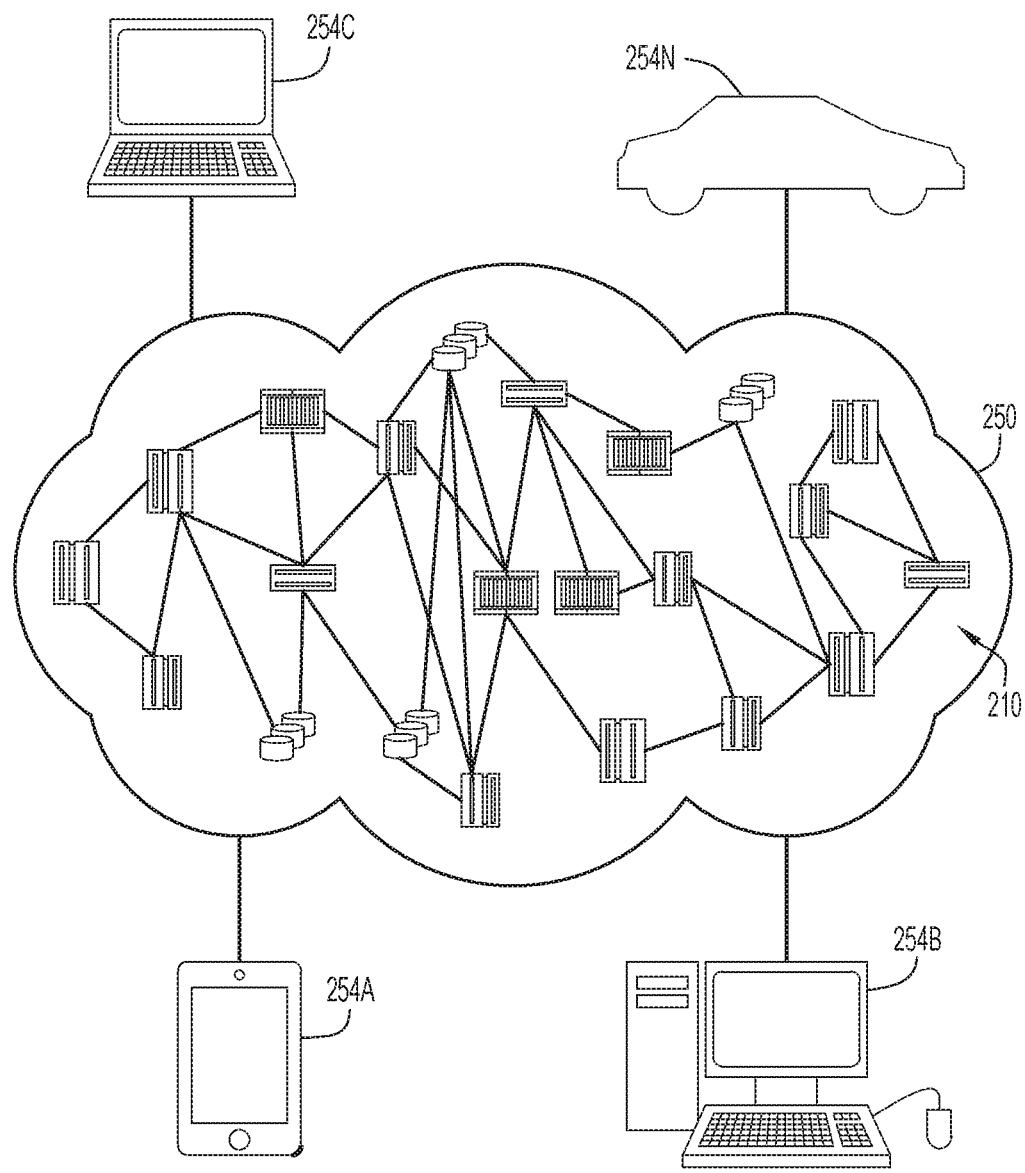
FIG. 2 depicts a cloud computing environment according to an embodiment of the present invention.

Referring now to FIG. 2, illustrative cloud computing environment 250 is depicted. As shown, cloud computing environment 250 includes one or more cloud computing nodes 210 with which local computing devices used by cloud consumers, such as, for example, personal digital assistant (PDA) or cellular telephone 254A, desktop computer 254B, laptop computer 254C, and/or automobile computer system 254N may communicate. Nodes 210 may communicate with one another. They may be grouped (not shown) physically or virtually, in one or more networks, such as Private, Community, Public, or Hybrid clouds as described hereinabove, or a combination thereof. This allows cloud computing environment 250 to offer infrastructure, platforms and/or software as services for which a cloud consumer does not need to maintain resources on a local computing device. It is understood that the types of computing devices 254A-N shown in FIG. 2 are intended to be illustrative only and that computing nodes 210 and cloud computing environment 250 can communicate with any type of computerized device over any type of network and/or network addressable connection (e.g., using a web browser).

Figure 3:
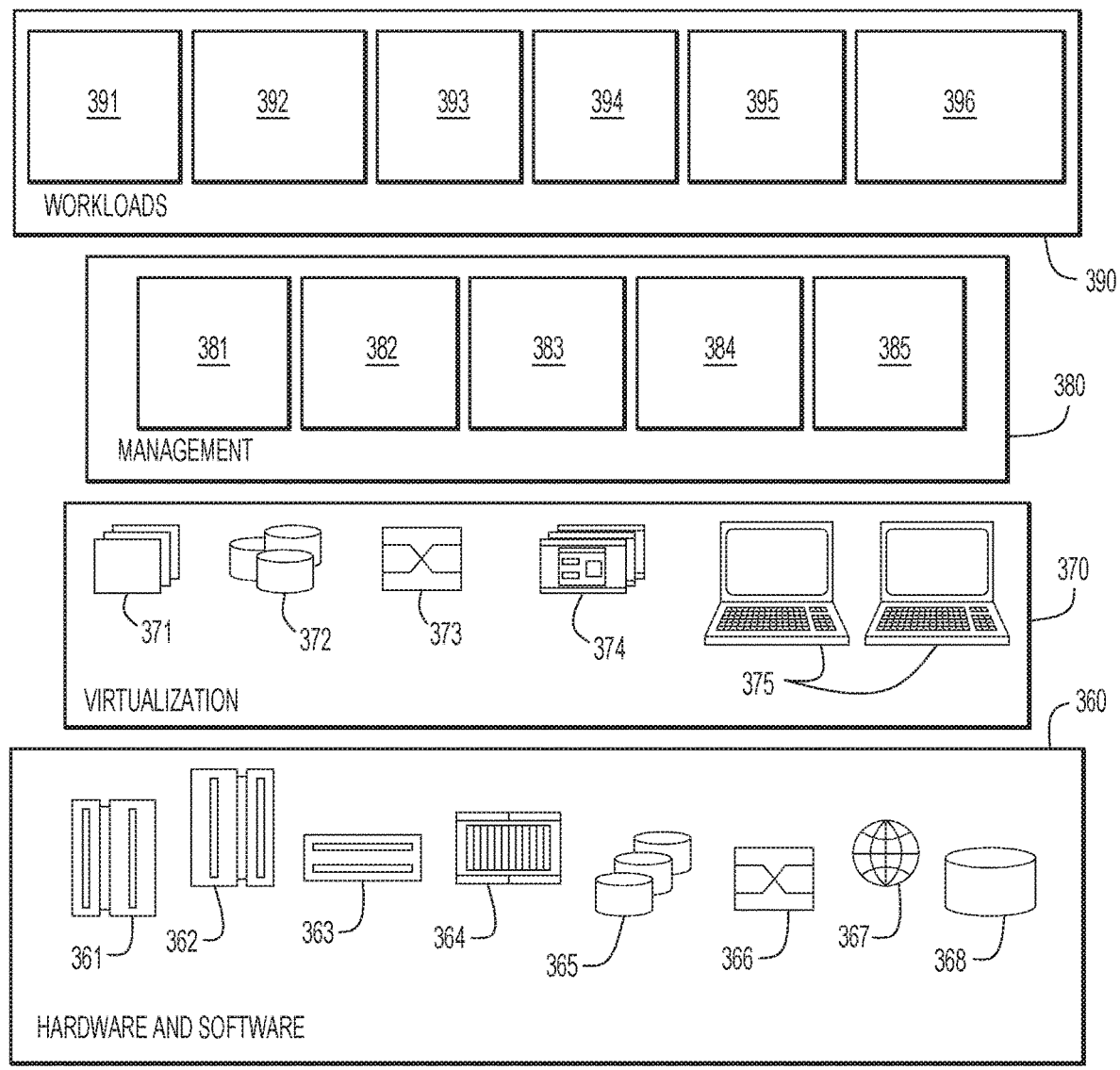
FIG. 3 depicts abstraction model layers according to an embodiment of the present invention.

Referring now to FIG. 3, a set of functional abstraction layers provided by cloud computing environment 250 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 360 includes hardware and software components. Examples of hardware components include: mainframes 631; RISC (Reduced Instruction Set Computer) architecture based servers 362; servers 363; blade servers 364; storage devices 365; and networks and networking components 366. In some embodiments, software components include network application server software 367 and database software 368.

Virtualization layer 370 provides an abstraction layer from which the following examples of virtual entities may be provided: virtual servers 371; virtual storage 372; virtual networks 373, including virtual private networks; virtual applications and operating systems 374; and virtual clients 375.

In one example, management layer 380 may provide the functions described below. Resource provisioning 381 provides dynamic procurement of computing resources and other resources that are utilized to perform tasks within the cloud computing environment. Metering and Pricing 382 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 383 provides access to the cloud computing environment for consumers and system administrators. Service level management 384 provides cloud computing resource allocation and management such that required service levels are met. Service Level Agreement (SLA) planning and fulfillment 385 provide pre-arrangement for, and procurement of, cloud computing resources for which a future requirement is anticipated in accordance with an SLA.

Workloads layer 390 provides examples of functionality for which the cloud computing environment may be utilized. Examples of workloads and functions which may be provided from this layer include: mapping and navigation 391; software development and lifecycle management 392; virtual classroom education delivery 93; data analytics processing 394; transaction processing 395; and mobile desktop 396.

Figure 4:
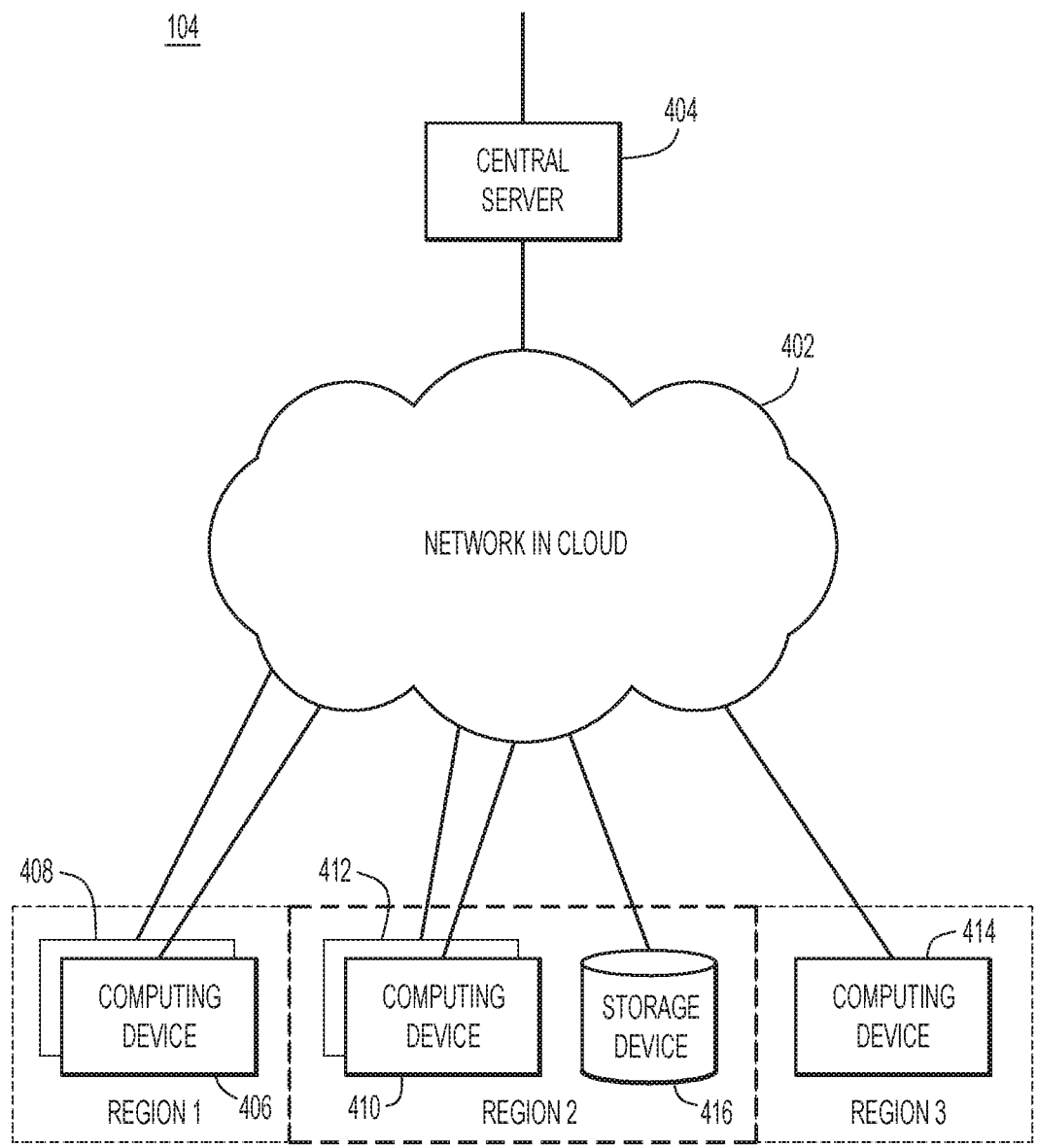
FIG. 4 illustrates a specific example cloud computing environment in which computing devices are located in multiple geographic regions.
Figure 5:
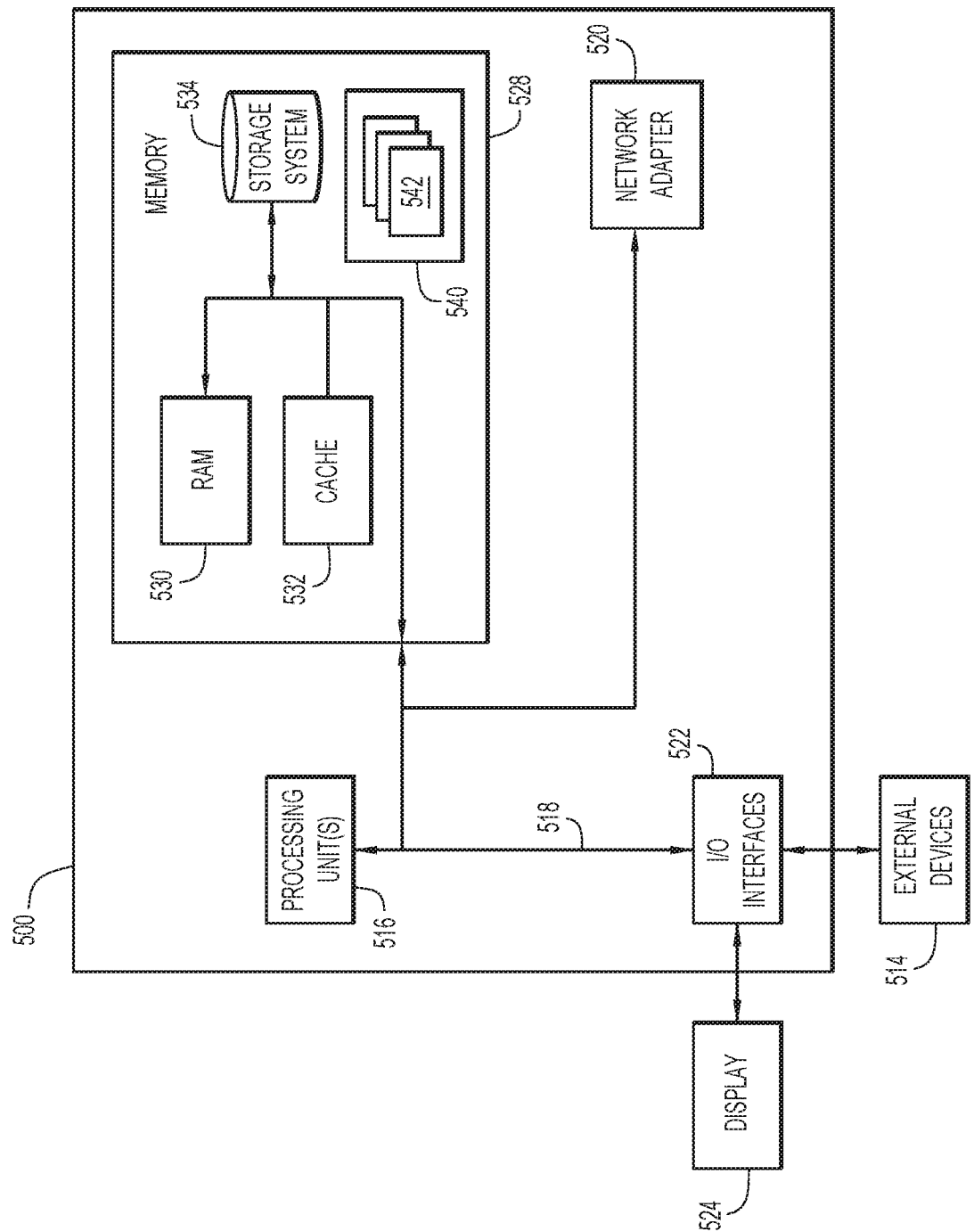
FIG. 5 is a functional block diagram of a general purpose computer for implementing embodiments of the invention.

FIG. 4 illustrates, in more detail, example cloud computing environment 104 of FIG. 1 in which processing and storage may be confined to a geographic region in which data is stored. As shown, FIG. 4 includes central server 404 connected to network 102 and connected to network 402 within cloud computing environment 104 via a wireless or a wired connection.

Like network 102, network 402 may be implemented by any number of any suitable communications media (e.g., wide area network (WAN), local area network (LAN), Internet, Intranet, etc.).

Example cloud computing environment 104 of FIG. 4 includes three geographic regions, shown as region 1, region 2 and region 3. In other embodiments, a cloud computing environment may include fewer or more geographic regions. Each of regions 1, 2 and 3 may include one or more computing devices. The one or more computing devices include computing devices 406, 408 of region 1, computing devices 410, 412 of region 2, and computing device 414 of region 3. Further, region 2 includes a storage device 416 accessible by computing devices 410, 412. In other implementations, regions 1-3 may include more computing devices or regions 1 and 2 may include fewer computing devices. Similarly, regions 1 and 3 may include one or more storage devices and region 2 may include additional storage devices.

Referring now to FIG. 3, a schematic of an example computer system 500 is shown, which may implement any of end user processing device 106, central server 404, and computing devices 406-414 in various embodiments. Computer system 500 is shown in a form of a general-purpose computing device. Components of computer system 500 may include, but are not limited to, one or more processors or processing units 516, a system memory 528, and a bus 518 that couples various system components including system memory 528 to one or more processing units 516.

Bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 500 may include a variety of computer readable media. Such media may be any available media that is accessible by computer system 500, and may include both volatile and non-volatile media, removable and non-removable media.

System memory 528 can include computer system readable media in the form of volatile memory, such as random access memory (RAM) 530 and/or cache memory 532. Computer system 500 may further include other removable/non-removable, volatile/non-volatile computer storage media. By way of example only, storage system 534 can be provided for reading from and writing to a non-removable, non-volatile magnetic medium (not shown, which may include a "hard drive" or a Secure Digital (SD) card). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 518 by one or more data media interfaces. As will be further depicted and described below, memory 528 may include at least one program product having a set (e.g., at least one) of program modules that are configured to carry out the functions of embodiments of the invention.

Program/utility 540, having a set (at least one) of program modules 542, may be stored in memory 528 by way of example, and not limitation, as well as an operating system, one or more application programs, other program modules, and program data. Each of the operating system, the one or more application programs, the other program modules, and the program data or some combination thereof, may include an implementation of a networking environment. Program modules 542 generally carry out the functions and/or methodologies of embodiments of the invention as described herein.

Computer system 500 may also communicate with one or more external devices 514 such as a keyboard, a pointing device, one or more displays 524, one or more devices that enable a user to interact with computer system 500, and/or any devices (e.g., network card, modem, etc.) that enable computer system 500 to communicate with one or more other computing devices. Such communication can occur via Input/Output (I/O) interfaces 522. Still yet, computer system 500 can communicate with one or more networks such as a local area network (LAN), a general wide area network (WAN), and/or a public network (e.g., the Internet) via network adapter 520. As depicted, network adapter 520 communicates with the other components of computer system 500 via bus 518. It should be understood that, although not shown, other hardware and/or software components could be used in conjunction with computer system 500. Examples, include, but are not limited to: a microphone, one or more speakers, microcode, device drivers, redundant processing units, external disk drive arrays, RAID systems, tape drives, and data archival storage systems, etc.

Figure 6:
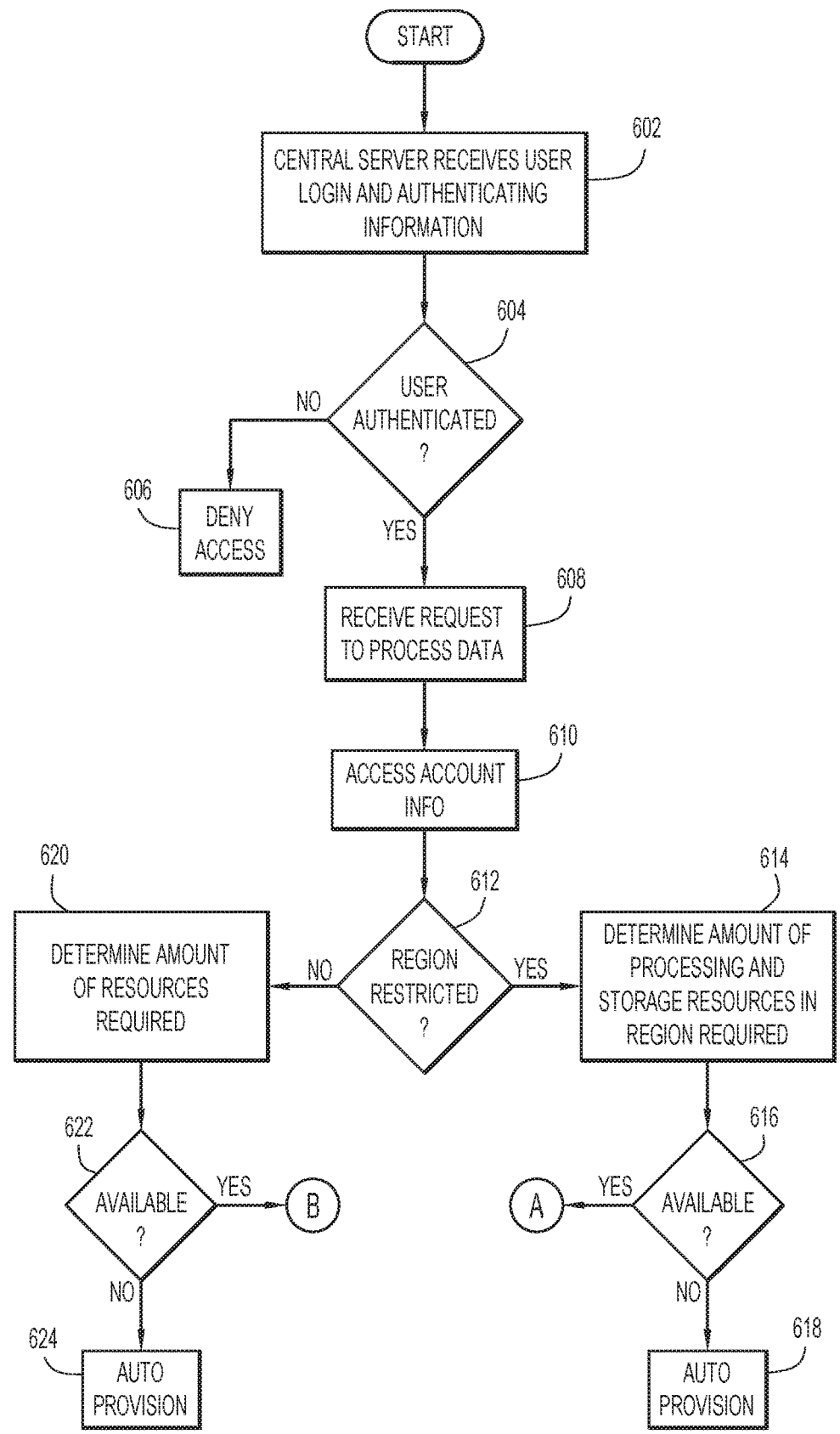
FIGS. 6-8 are flowcharts illustrating an example process that may be performed according to various embodiments.

FIG. 6 is a flowchart that illustrates an example process performed according to embodiments of the invention. The process may begin with central server 404 receiving a user login and accompanying authenticating information (act 602). Central server 404 then may determine whether the received authenticating information is valid for the user login (act 604). If the authenticating information is not valid for the user login, then central server 404 may deny access to the multitenant system (act 606).

If, during act 604, central server 404 determines that the authenticating information is valid for the user login, then the user is authenticated and central server 404 may receive a request to process data from end user processing device 106 of the user (act 608). Central server 404 then may access account information associated with the user (act 610).

With reference to FIG. 4, assume that central server 404 determines, via the accessed account information, that the data to be processed is restricted such that the data is confined to a particular geographic region, geographic region 2, the geographic region in which the data is stored (act 612). Central server 404 then may determine an amount of processing and storage resources that are required to process the data and store the processed data in the particular geographic region (geographic region 2) (act 614). In some embodiments, the amount of processing and storage resources required may be included in the accessed account information. In other embodiments, other methods may be used to determine an amount of processing and storage resources required in a particular geographic region for processing and storage associated with an account.

Next, central server 404 may determine whether the required processing and storage resources in the particular geographic region are available by contacting resources in the particular geographic region to query the resources, or via other methods. In this example, with reference to FIG. 4, central server 404 determines, during act 616, whether the required resources are available in the geographic region 2. In some embodiments, central server 404 may contact resources within the particular geographic region to determine lengths of certain queues in computing devices within the particular geographic region, waiting times in the certain queues, load on processors, etc. If central processor 404 determines that additional resources in the geographic region are desired or needed, and permitted for the account, central server 404 may automatically provision the additional resources in the geographic region (act 618). If the provisioning of the additional resources is unsuccessful, then access may be denied (not shown).

Figure 7:
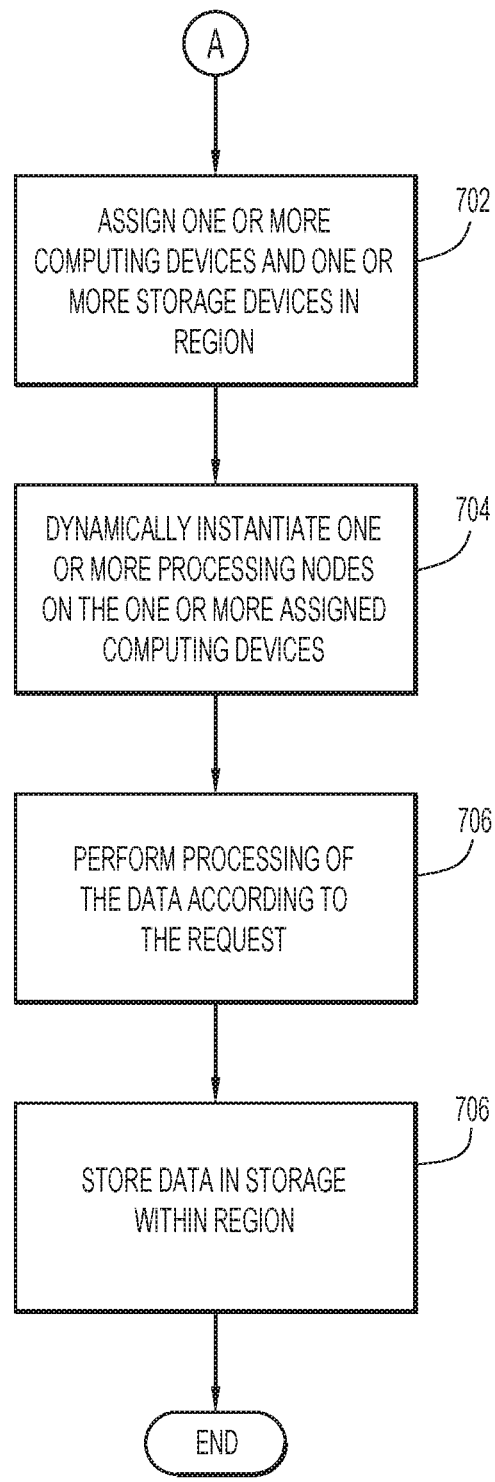

Central server 404 then may assign one or more computing devices 410, 412 in the geographic region 2 for processing the data and one or more storage devices 416 for storage of the data in the geographic region 2 (act 702; FIG. 7).

Central server 404 then may dynamically instantiate one or more processing nodes on the one or more assigned computing devices 410, 412 in the geographic region 2 for processing the data (act 704). Each of the one or more processing nodes may include a respective virtual machine. Alternatively, the one or more processing nodes may have been previously instantiated on the one or more computing devices in the geographic region 2 and may not be dynamically instantiated.

At this point, the one or more computing devices 410, 412 within the geographic region 2 may process the data, which may have been previously stored on a storage device such as, for example, storage device 416 in the geographic region 2 (act 706). After being processed, the processed data may be stored on storage device 416 or another storage device in the geographic region 2 (act 708).

Although, in the above example, the accessed account information indicated that the data is to be confined to the geographic region 2, the account information could have indicated that the data is to be confined to a different geographic region or that the data is not to be confined to any particular geographic region.

Returning to FIG. 6, if, during act 612, central server 404 determines that the accessed account information associated with the user indicates that the data to be processed is not restricted such that the data is not to be confined to any particular geographic region, then central server 404 may determine an amount of resources required to process and store the data in any geographic region (act 620). In some embodiments, the amount of resources required may be determined based on the accessed account information. In other embodiments, the amount of resources required may be determined via another method. Next, central server 404 may determine whether the required processing and storage resources in any geographic region are available (act 622). If the required resources are determined not to be available, then central server 404 may automatically provision the resources if additional resources are permitted as may be determined based on the accessed account information or via other methods (act 624). If the provisioning of the resources is unsuccessful, then access may be denied (not shown).

Figure 8:
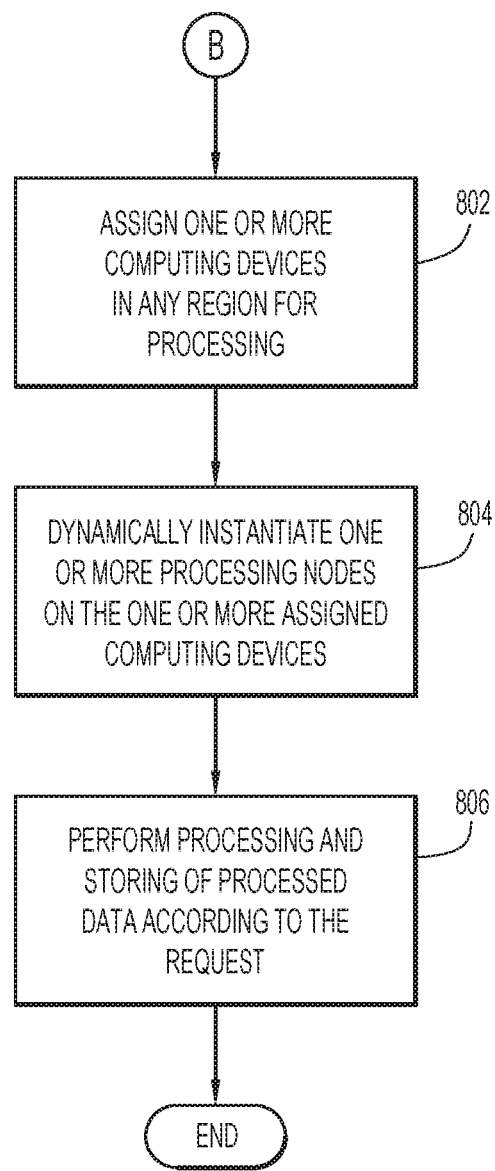

If, during act 622, central server 404 determines that the required amount of resources are available or, during act 624, central server 404 successfully provisions the additional resources, then central server 404 may assign one or more computing devices in any geographic region for processing (act 802; FIG. 8). Central server 404 then may dynamically instantiate one or more processing nodes on the one or more assigned computing devices (act 804). Each of the one or more processing nodes may include a respective virtual machine in some embodiments. Alternatively, the one or more processing nodes may have been previously instantiated on the one or more computing devices in the geographic region 2 and may not be dynamically instantiated.

The one or more processing nodes included in the one or more assigned computing devices then may process the data and store the processed data according to the received request (act 806).

It will be appreciated that the embodiments described above and illustrated in the drawings represent only a few of the many ways of implementing embodiments for confining processing and storage of sensitive data to a geographic region.

The environment of the present invention embodiments may include any number of computer or other processing systems and databases or other repositories arranged in any desired fashion, where the present invention embodiments may be applied to a multitenant cloud computing environment. The computer or other processing systems employed by the present invention embodiments may be implemented by any number of any personal or other type of computer or processing system (e.g., desktop, laptop, etc.), and may include any commercially available operating system and any combination of commercially available and custom software (e.g., browser software, communications software, server software, etc.). These systems may include any types of monitors and input devices (e.g., keyboard, mouse, voice recognition, etc.) to enter and/or view information.

It is to be understood that the software of the present invention embodiments may be implemented in any desired computer language and could be developed by one of ordinary skill in the computer arts based on the functional descriptions contained in the specification and flowcharts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various computing devices and server systems, and/or any other intermediary processing devices. The software and/or algorithms described above and illustrated in the flowcharts may be modified in any manner that accomplishes the functions described herein. In addition, the functions in the flowcharts or description may be performed in any order that accomplishes a desired operation.

The software of the present invention embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information. The database system may be included within or coupled to a server and/or client systems. The database systems and/or storage structures may be remote from or local to the computer or other processing systems, and may store any desired data.

The present invention embodiments may employ any number of any type of user interface (e.g., Graphical User Interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute on a remote computer and a remote server. The remote server may be connected to a user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method in a computing device comprising at least one processor and at least one memory, the at least one memory comprising instructions executed by the at least one processor of the computing device to process data based on a geographic region in which the data is confined, the method comprising:
- receiving a request to process data previously stored in a geographic region, wherein the computing device is within a distributed computing system spanning a plurality of geographic regions with each geographic region including one or more computing devices, and wherein the computing device is located outside the geographic region in which the data for the request has been previously stored;
- determining that the data to be processed for the request is confined to the geographic region in which the data has been previously stored;
- determining processing and storage resources needed to process the data for the request;
- determining that additional processing and storage resources beyond available resources within the geographic region to which the data is confined are needed to process the data for the request within that geographic region;
- automatically provisioning the additional processing and storage resources within the geographic region to which the data is confined;
- in response to provisioning the additional processing and storage resources:
- identifying a second computing device within the geographic region to which the data is confined, the identified second computing device and the computing device being connected to a network;
- determining that the identified second computing device lacks nodes to process the data for the request;
- dynamically instantiating one or more processing nodes on the identified second computing device with the processing and storage resources needed to process the data for the request; and
- directing the identified second computing device to process the data within the geographic region to which the data is confined, according to the request, by the one or more instantiated processing nodes executing on the identified second computing device; and
- denying the request to process the data previously stored in the geographic region in response to failure of the provisioning of the additional processing and storage resources.

2. The method of claim 1, wherein the data is secured against residing outside the geographic region.

3. The method of claim 1, wherein the computing device and the identified second computing device are included in a multitenant cloud computing environment.

4. The method of claim 1, further comprising:
receiving and authenticating a user login by the computing device; wherein:
the determining that the processing of the data for the request is to be confined to the geographic region in which the data has been previously stored further comprises:
accessing account information associated with the user login, and
determining that the processing of the data for the request is to be confined to the geographic region in which the data has been previously stored based on the accessed account information.

5. The method of claim 1, wherein each of the one or more instantiated processing nodes includes a respective virtual machine.

6. A system for processing data based on a geographic region in which the data is stored, the system comprising:
a first computing device configured to:
- receive a request to process data previously stored in a geographic region, wherein the first computing device is within a distributed computing system spanning a plurality of geographic regions with each geographic region including one or more computing devices, and wherein the first computing device is located outside the geographic region in which the data for the request has been previously stored;
- determine that the data to be processed for the request is confined to the geographic region in which the data has been previously stored;
- determine processing and storage resources needed to process the data for the request;
- determine that additional processing and storage resources beyond available resources within the geographic region to which the data is confined are needed to process the data for the request within that geographic region;
- automatically provision the additional processing and storage resources within the geographic region to which the data is confined;
- in response to provisioning the additional processing and storage resources:
  - identify a second computing device within the geographic region to which the data is confined, the identified second computing device and the first computing device being connected to a network;
  - determine that the identified second computing device lacks nodes to process the data for the request;
  - dynamically instantiate one or more processing nodes on the identified second computing device with the processing and storage resources needed to process the data for the request; and
  - direct the identified second computing device to process the data within the geographic region to which the data is confined, according to the request, by the one or more instantiated processing nodes executing on the identified second computing device; and
- deny the request to process the data previously stored in the geographic region in response to failure of the provisioning of the additional processing and storage resources.

7. The system of claim 6, wherein the data is secured against residing outside the geographic region.

8. The system of claim 6, wherein the first computing device and the identified second computing device are included in a multitenant cloud computing environment.

9. The system of claim 6, wherein:
the first computing device is further configured to receive and authenticate a user login, and
the first computing device being configured to determine that the processing of the data for the request is to be confined to the geographic region in which the data has been previously stored further comprises the first computing device being configured to:
access account information associated with the user login, and
determine that the processing of the data for the request is to be confined to the geographic region in which the data has been previously stored based on the accessed account information.

10. The system of claim 6, wherein each of the one or more instantiated processing nodes includes a respective virtual machine.

11. A computer program product comprising at least one computer readable storage medium having computer readable program code embodied therewith, the computer readable program code including a plurality of instructions for execution on at least one processor of a computing device, wherein:
the plurality of instructions of the computer readable program code are configured to be executed by the at least one processor of the computing device to:
receive a request to process data previously stored in a geographic region, wherein the computing device is within a distributed computing system spanning a plurality of geographic regions with each geographic region including one or more computing devices, and wherein the computing device is located outside the geographic region in which the data for the request has been previously stored;
determine that the data to be processed for the request is confined to the geographic region in which the data has been previously stored;
determine processing and storage resources needed to process the data for the request;
determine that additional processing and storage resources beyond available resources within the geographic region to which the data is confined are needed to process the data for the request within that geographic region;
automatically provision the additional processing and storage resources within the geographic region to which the data is confined;
in response to provisioning the additional processing and storage resources:
identify a second computing device within the geographic region to which the data is confined, the identified second computing device and the computing device being connected to a network;
determine that the identified second computing device lacks nodes to process the data for the request;
dynamically instantiate one or more processing nodes on the identified second computing device with the processing and storage resources needed to process the data for the request; and
direct the identified second computing device to process the data within the geographic region to which the data is confined, according to the request, by the one or more instantiated processing nodes executing on the identified second computing device; and
deny the request to process the data previously stored in the geographic region in response to failure of the provisioning of the additional processing and storage resources.

12. The computer program product of claim 11, wherein the data is secured against residing outside the geographic region.

13. The computer program product of claim 11, wherein the plurality of instructions are further configured for execution on the at least one processor of the computing device to:
receive and authenticate a user login, and
determine that the processing of the data for the request is to be confined to the geographic region in which the data has been previously stored by:
accessing account information associated with the user login, and
determine that the processing of the data for the request is to be confined to the geographic region in which the data has been previously stored based on the accessed account information.

14. The computer program product of claim 11, wherein each of the one or more instantiated processing nodes includes a respective virtual machine.

15. The computer program product of claim 11, wherein the computing device and the identified second computing device are included in a multitenant cloud computing environment.

* * * * *